United States Patent
Armstrong

[11] Patent Number: 5,213,237
[45] Date of Patent: May 25, 1993

[54] LOCK GATE BLADE-TYPE VALVE

[76] Inventor: George W. Armstrong, P.O. Box 507, Fairborn, Ohio 45324

[21] Appl. No.: 864,476

[22] Filed: Apr. 6, 1992

[51] Int. Cl.⁵ .................. G01F 11/28; B67D 3/00
[52] U.S. Cl. .................. 222/452; 137/613; 222/542; 222/434; 251/301; 251/335.1; 277/9
[58] Field of Search ........ 222/542, 504, 445, 450-452, 222/559-561, 434; 277/9; 251/301, 335.1; 137/6 B

[56] References Cited

U.S. PATENT DOCUMENTS

| | | |
|---|---|---|
| 2,806,489 | 9/1957 | Armstrong ............ 251/301 X |
| 2,949,275 | 8/1960 | Pro ....................... 222/452 UX |
| 3,090,593 | 5/1963 | Pro ....................... 222/450 X |
| 3,380,475 | 4/1968 | Armstrong ............ 251/301 X |
| 3,556,358 | 1/1971 | Armstrong ............ 222/445 |
| 3,799,187 | 3/1974 | Armstrong . |
| 3,813,015 | 5/1974 | Armstrong ............ 222/445 |
| 3,907,178 | 9/1975 | Armstrong ............ 222/504 |
| 3,916,949 | 11/1975 | Armstrong ............ 251/301 |
| 5,139,048 | 8/1992 | Armstrong ............ 137/553 |

Primary Examiner—Kevin F. Shaver
Attorney, Agent, or Firm—Biebel & French

[57] ABSTRACT

A low profile, lock-gate type of valve for handling dry particulate material forms a conduit therethrough, and a pair of curved flow control blades are mounted on arms and are pivoted with respect to the conduit, to define therebetween a flow measuring chamber, in which the blades are supplied with the convex surface facing the direction of flow in the conduit. The conduit is doglegged within the valve to provide a low valve profile, and the blades are fully enclosed within the blade housing. A part of the enclosure walls form surfaces on which air cylinders are mounted for controlling the movement of the valve blades. The valve blade seals are accessible from an exterior wall of the valve and are replaceable by extraction through wall openings, and the valve seals are mounted on external brackets on the valve side walls so that they may be easily withdrawn and replaced.

9 Claims, 6 Drawing Sheets

LOCK GATE BLADE-TYPE VALVE

BACKGROUND OF THE INVENTION

This invention is directed to a lock gate blade type valve and more particularly to a lock gate valve for particulate or flowable bulk-type material having curved blades for controlling the flow through a conduit.

My prior patents illustrate lock gate flow control or metering valves for flowable bulk material which control the flow with a pair of curved flow control blades. Thus, my U.S. Pat. Nos. 3,813,015; 3,556,358 and 3,799,187 shows lock gate valves in which the top and bottom blades are reversed in relative position to each other such that the material entering the valve falls on a convex surface of the upper blade. When the upper blade opens, the material passes into a valve holding chamber and falls onto a concave surface of the lower blade. My patents also show arrangements for sealing the moving blades along the moving surfaces, and my U.S. Pat. Nos. 3,556,358 and 3,813,015 illustrate pneumatic control systems for causing and controlling the sequential movement of the blades and blade arms.

Many lock gate valve installations have a requirement for enclosing the working components of the valve for the control of the flow of dry particulate material. Fully enclosed lock gate valves, that is, valves in which the blade arm and blade mounting and moving mechanisms are enclosed, are desirable for preventing the possibility of contamination by the leakage of material outside the valve to the material inside the valve, and also for preventing any leakage of the material being handled by valve to prevent contamination to the atmosphere and environment external to the valve.

A fully enclosed lock gate valve also using inverted flow control blades, as previously described, is shown in my U.S. Pat. No. 3,907,178 issued Sep. 23, 1975. Due to the necessity for providing large exterior chambers on either lateral side of the valve for housing the blade and blade arms, and due to the extent of blade movement, the valve operating cylinders, as identified by reference numerals 60 and 62 in patent '178, extended to positions above and below the respective top and bottom mounting flanges of the valve. Therefore, installation of the valve shown in my U.S. Pat. No. 3,907,178 in confined conditions was complicated when the valve could not easily be moved in and/or out of position due to the additional headroom required at the top and the bottom of the valve for the cylinders.

The lock gate valves as shown in certain of my prior patents had a disadvantage due to the fact that the bottom flow control blade was inverted with respect to the upper blade. At the time these inventions were made and the corresponding patent applications were filed, it was considered desirable that such valves have a holding chamber between the blades of maximum capacity. While I believed that a blade which curves into the direction of material flow is to be preferred over an inverted blade, for the bottom blade this provided complications in design which I had been unable to resolve. Since I considered any reduction in the measuring or holding capacity of the valve to be generally undesirable, the bottom blade was positioned in inverted relation to the top blade, even though it had a higher stress placed on it by reason of the weight of material resting thereon. The bottom blade was harder to seal, and required more power to operate, than the upper blade.

In some instances, a lock gate or flow measuring valve was made using two single bladed valves of the type shown in my U.S. Pat. No. 3,380,475 issued Apr. 30, 1968, with one valve mounted above the other in a common conduit, as illustrated in FIG. 4 of my U.S. Pat. No. 3,813,015. While this resulted in what I believed to be a superior positioning of the flow control blades, it also resulted in an unwieldy height to the overall mechanism and an added expense, both of which restricted its use.

It is often desirable to substitute a curved or rolling blade type of lock gate valve for a conventional rotary feed valve. Rotary feed valves themselves have certain advantages, but also have disadvantages in that they require substantially greater power to operate, and usually require expensive, explosion proof electric drive motors. Due to the power input requirements, they can generate a substantial amount of heat as the valve rotates. Therefore, while it may be desirable to replace a rotary valve with a more simple and energy efficient rolling blade valve, space requirements are usually strict, thereby demanding a compact rotary valve arrangement.

Automatic weighing systems now favor metering valves which dispense smaller portions or increments of bulk material and at a faster rate. Many such systems require that the material be supplied in smaller increments to provide a smoother delivery and greater accuracy in weighing and blending component parts of a mix, such as an animal feed mix. Therefore, the increased capacity which was available between the inverted blades as illustrated in my prior lock gate patents are not required or even desirable for many installations.

SUMMARY OF THE INVENTION

This invention is directed to an improved, fully enclosed lock gate valve of the rolling blade type in which each of the blades is positioned with its convex side facing the in-coming material, and in a single low profile housing. Use is made of the improved direct powered valve blade operating mechanism as shown in my U.S. Pat. No. 5,139,048, incorporated herein by reference.

An improved valve housing defines a specific shape of flow conduit therethrough. The conduit extends from an inlet at the valve housing and an outlet at the valve housing bottom. The conduit is formed between a pair of spaced-apart, generally flat side plates of the valve housing and between transverse walls which extend normally to the side plates. One of the inside walls which define the conduit is inclined to the vertical, and its lower end forms an abutment for the nose of the upper blade. This inclined inside conduit wall terminates in spaced relation to a lower outside oppositely sloping wall forming an opposite wall of the conduit. The lower wall, in turn, at a lower end thereof, forms an abutment for the nose of the lower blade in the closed position. The space in the conduit between the two curved blades and the side plates forms a holding chamber which defines the measuring capacity of the lock gate valve.

The internal conduit section of the housing is formed by land carrying walls, which extend between the side plates and which slope with respect to the vertical. These walls are formed with an angle of approximately 45° to the vertical so that they are and remain self-cleaning. Since these walls, in the closed position of the valve blades, carry much of the weight of the material, substantially less of the load is applied to the valve blades.

A further advantage of the valve of this invention is the fact that it is provided with blade seals which are externally replaceable without the need of disassembling the valve from its conduit. Therefore, at such time as the blade seals are worn, they may be replaced through suitable openings formed in the side plates. Further, the side seals may be removed, when desired, to inspect the quality and condition of the blade slot seals, during the course of normal inspections. Also, the capacity of the valve according to this design may be increased or decreased by fabricating the components with spaced apart side walls which are either further apart or closer together. That is, the overall width of the valve plate may be changed to increase or decrease capacity.

Direct acting motors, such as air cylinders of a relatively short axial length drive the blades. The air cylinders are mounted on the housing which encloses the blades, and do not extend either above or below the upper or lower housing valve mounting flanges. The air cylinders are directly connected by self-aligning drive connections to drive the support arms for the blades in the manner described in my U.S. Pat. No. 5,139,048. The advantages stated in my copending application by reason of the direct connection of the operating cylinders to the blade arms, including a piston rod which moves along a line substantially tangent to an arc of blade movement, for a highly efficient actuating connection, are enjoyed by the present invention. Since the connection between the air cylinder and the blade is mechanically efficient, the cylinder may be of relatively short length and therefore of low profile.

Both blades, when closing, move into and with the direction of flow. For this reason the blades tend to be self-closing. When closed the blades are positioned along substantially vertical planes. Therefore, the weight of the material against either of the blades has a negligible effect on opening friction. The blades may thus be easily opened in spite of the fact that the material in the valve or above the valve is pressing against the upper surface of the blade. This is particularly important in connection with the upper of the two blades since there is usually a column of the material above the blade extending many feet in height, leading to a storage bin or the like. Also, the valve is non-jamming, and large objects can fall through without stopping the valve gate sequencing.

The blades and blade support arms, which are identical and interchangeable, are arranged to have a relatively short stroke and are designed for rapid operation, such as 20–30 cycles per minute, so that the bulk material being measured, the delivery of which is controlled, can be done so at a relatively rapid rate, equally or surpassing the delivery capacity of a rotary valve of corresponding dimensions. While short stroke air cylinders are preferred, obviously electric solenoid valves or other types of electric or fluid actuators may be used.

The relatively smaller holding capacity of the chamber portion of the conduit defined between the closed blades provides improved accuracy as needed for precision weighing systems. Since the batches which are delivered by the valve are smaller, the gate must cycle somewhat faster in order to obtain the same capacity. However, this more rapid rate of cycling does not require more air for operating the air cylinders, since the cylinders are formed with a short stroke. They may also have a small bore since the driving forces are applied to the blade support arms remote from the arm pivots and close to the associated blade, and require less power. Further, the linkage as defined in my copending application and as used in this invention operates with less friction and thus uses less power.

The blade design in which both blades roll into the direction of flow and terminate in a substantially vertical relation, is one which tends to be self-closing. The valve blades can be opened with a relatively low force since the vertical components of the weight of material above the valve and inside the valve are carried, in part, by the inclined walls of the valve and not by the blades themselves.

The employment of a pair of curved blades in which the curvature faces downwardly, provides other advantages. The blades are stronger in this position and accordingly are easier to seal and to maintain the seal. Material which hits the blades tends to scatter and deflect by reason of the curvature, and the worn or hot spot commonly found on flat slide blades or in blades which curve in the opposite direction, is avoided. Accordingly, wear tends to be distributed rather than concentrated on a small surface of the blade.

The gate valve of this invention is provided with enclosed offset valve blade housings which are sealed from the flow conduit or passageway, and are also sealed from the outside. These compartments may, if required, be air purged from any accumulated material therein and/or alternatively, may be pressurized slightly so that any leakage is inward rather than outward. Additionally, pressurization can assist in the maintenance of a blade seal. As previously noted, the position o the blades with respect to the flow passageway or conduit is one which promotes easy opening in spite of the weight of material thereon, using only low motive forces. Blade closing is assisted by reason of the fact that the closing movement is in the direction of movement of the material. Therefore, the design is one which is saving of energy, and at least when compared wit a rotary feed valve, uses substantially less energy.

Another advantage of the invention resides in the fact that the blade seals are replaceable from outside of the housing. This feature allows for the servicing of the valve without having to remove it from its installation. Down time is reduced and seal inspection is made easier.

Construction costs are reduced by designing both of the blade pairs, their respective arms and linkages, as well as their operating cylinders, so that they may be interchanged. Also, the drive linkage between the rotary motion and the linear motion of the air cylinder is self-aligning, which simplifies assembly, simplifies alignment, and reduces wear.

Another construction feature of this valve is the fact that the side plates of the housing may be spread further apart or moved closer together for the purpose of changing the capacity of the valve without changing the height. Thus, a selection of widths can be provided for the purpose of changing valve capacity at relatively minimal costs.

It is therefore an important object of the invention to provide an improved fully enclosed lock gate valve using curved or cylindrical flow control valve gates, for controlling the flow and/or measuring of a dry particulate material in which a pair of curved blades present convex surfaces to the material being controlled throughout the opening and closed positions of the blades.

Another object of the invention is the provision of a flow control valve, of the kind described, in which the blade seals may be removed from a position outside of the housing and replaced, without the necessity of removing the valve from its position in the conduit.

These and other objects and advantages of the invention will be apparent from the following description, the accompanying drawings and the appended claims.

DESCRIPTION OF THE PREFERRED EMBODIMENT

Figure 1:
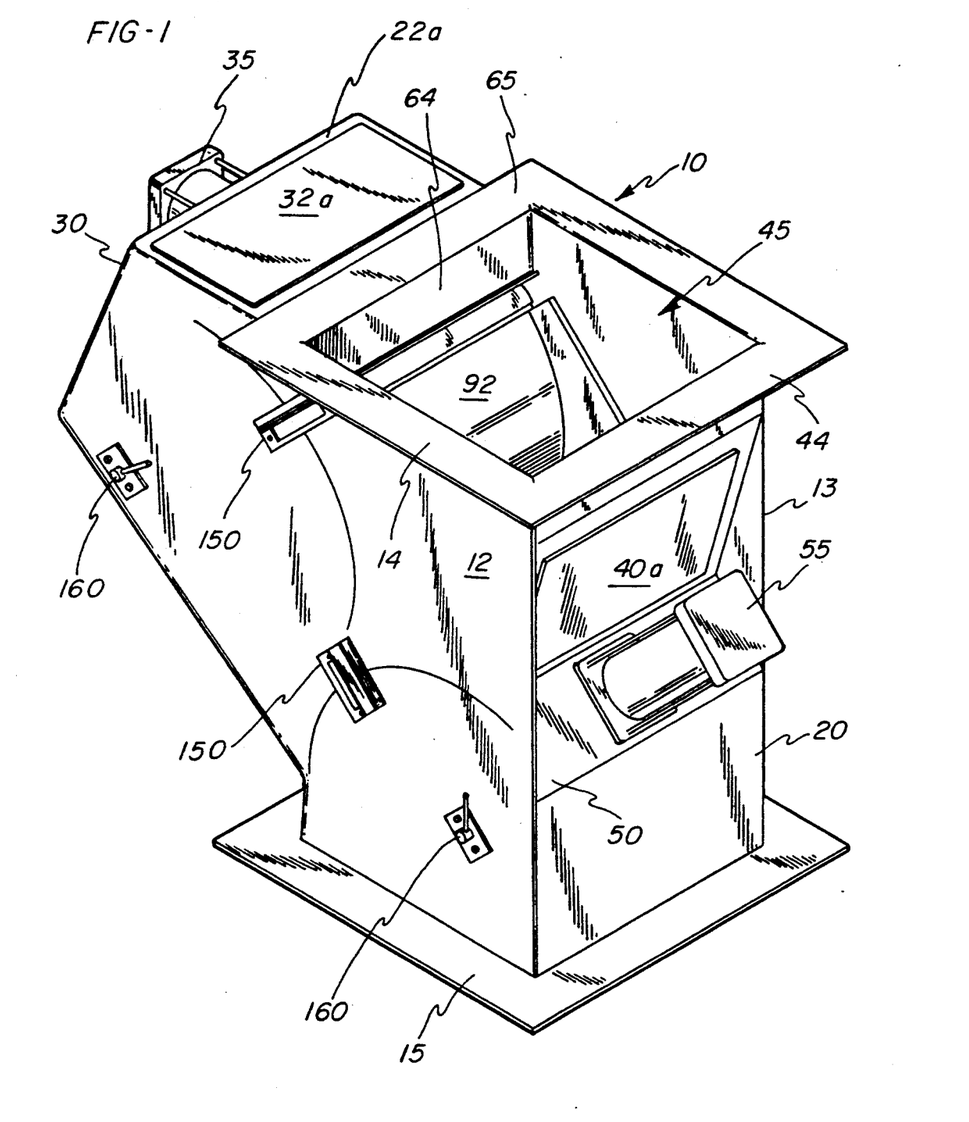
FIG. 1 is a perspective view of a valve according to this invention.

Referring to the figures of the drawing, which illustrate preferred embodiment of the invention, a low profile lock gate valve for dispensing measured quantities of dry particulate material is illustrated generally at 10 in FIG. 1. The valve 10 is formed with a valve housing including a first generally planar side wall plate 12 and a complementary shaped second generally flat side wall plates 13, an inside view of which is shown in the sectional view of FIG. 2. For ease of manufacture, the side plates may be made in left and right-hand versions, and include upper and lower outwardly turned lips 14 and 15 which form a part of the valve mounting flanges (FIG. 1).

Figure 2:
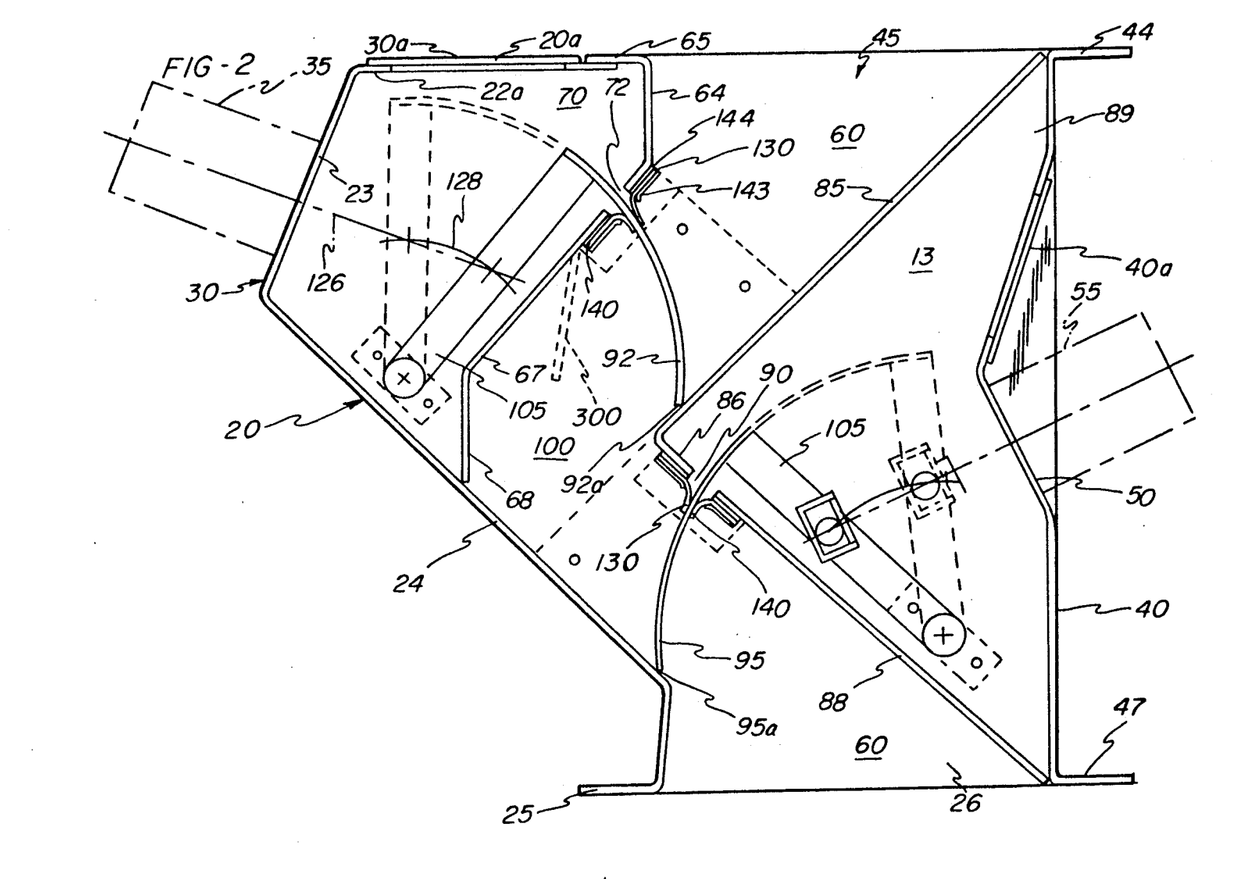
FIG. 2 is a transverse sectional view through the valve.

As is seen in either FIGS. 1 or 2, the housing 10 is offset to one side of a center line vertically through the valve. The spaced-apart side plates 12 and 13 form, respectively, the front and back walls of the valve housing 10.

The side plates are spaced apart by intermediate plates which extend in generally normal or in right angled relation to the side plates. These intermediate plates form the walls of an internal dog-leg flow conduit for the valve, and also form the walls which enclose the valve blade mechanisms and arms.

These intermediate plates include a pair of end closure plates which extend between the side plates 12 and 13, one each positioned generally along the front and rear edges of the side plates. A first end closure plate 20 (FIG. 2) has an upper generally horizontal portion 22a, a depending portion 23, and an elongated return section which also forms an inwardly inclined wall portion 24 for the intermediate conduit. The plate 20 therefore extends from the upper edge of the side plates to the lower edge of the side plates and is welded in place. The lower inwardly inclined wall portion 24 terminates at an outwardly directed mounting flange 25 forming part of the valve outlet 26. The wall portion 24 is about 45° to the vertical and forms a lower part of a valve conduit 60.

The intermediate depending portion 23 forms an exterior flat region or surface at 30 onto which a blade actuator cylinder may be mounted. As shown in FIG. 1, an direct actuating air cylinder 3 is mounted on the surface 30. The cylinder 35 is shown in phantom outline in FIG. 2.

The valve housing 10 further includes a second end closure plate 40 which extends generally vertically along the opposite side margin or edges of the side plates. The upper end forms part of the inlet mounting flange 44 for a valve inlet 45. The lower end forms part of the mounting flange 47 surrounding the valve outlet 26. Intermediate the ends, the plate 40 is formed with an inwardly inclined or depressed portion which forms a flat second actuator cylinder mounting region 50. The plate 40 at the region 50 provides a surface for mounting a second air cylinder 55, as shown in full line in FIG. 1 and in phantom in FIG. 2.

As best seen in FIG. 2, the housing further includes intermediate or inner walls which extend between the side plates to define the flow conduit 60 for the dry particular material. The flow conduit 60 extends in dog-leg fashion between the inlet 45 and the outlet 26 between the side plates such that the conduit 60 is offset toward the end plate 20.

The intermediate plates include first inner wall means extending from one side of the inlet 45 and terminating at the inclined wall section 24. The first inner wall means includes an upper generally vertically extending wall section 64 having an outwardly directed flange 65 forming part of the valve inlet mounting flange 44. A second section 67 forms a continuation of the first section 64 which extends, at first, diagonally toward the wall 20 at about 45° and then terminates in a downwardly turned section 68. The section 68 has a lower end in abutment with the inclined wall portion 24 substantially intermediate the ends of the section 24. The wall sections 64 and 67 are preferably welded to the respective front and back housing walls.

The two sections 64 and 67 make up one lateral side wall of the flow conduit 60, together with a portion of the inside surface of the inclined portion 24. The wall sections 64 and 67 also form a wall of a first flow control blade-receiving enclosure 70. The enclosure 70 is bounded by the side plates 12 and 13, the end plate 20 and the wall sections 64 and 67. The sections 64 and 67 also define a blade slot 72. The slot 70 extends transversely between the side plates 12 and 13 and opens into the conduit 60 and blade enclosure 70.

The laterally opposite side of the conduit 60 is defined by second intermediate plate means in the form of a second inner wall spaced laterally from the first inner wall means and forming a wall of the conduit 60 opposed from the wall sections 64 and 67. This structure includes a first inclined wall section 85 extending at about 45° from the inlet mounting flange 44 diagonally and generally parallel to the intermediate section 67. This intermediate wall section has a turned bottom end 86 in alignment with a second wall section 88. The second wall section 88 extends from the turned-in end 86, generally at right angles to the major portion of the section 85, and terminates at the outlet 26 immediately adjacent the mounting flange 47. The turned end 86 and section 88 are spaced from the inclined wall portion 24 about the same distance that the section 85 is spaced laterally from the section 67, thereby forming a continuation conduit 60.

The sections 85 and 88 which may also be welded in place define a second valve blade enclosure space 89 with the side plates 12 and 13 and with the second end enclosure plate 40. The turned-in end 86 and the section 88 are spaced apart to form a second blade slot 90 which also extends between the side walls 12, 13.

The valve housing also includes a pair of access and inspection plates, including an inspection plate 30a at the top of the first end plate 20, permitting access to the interior of the blade compartment, and a second inspection plate 40a on the end plate 40 above the actuator cylinder 55, and permitting access to the interior of the space 89.

The first blade slot 72 is formed between the plate section 64 and 67 and receives an upper or first flow control blade 92 therethrough. The second blade slot 90 receives therethrough a second identical curved flow control blade 95. The first flow control blade 92 forms or defines an upper valve blade. The blade 92 is movable from a closed position, as shown in full lines in FIG. 2, in which a nose end 92a is in engagement with the section 85, to an open position shown in phantom. In the closed position of the valve blade 95, the nose 95a is in abutment of contact with the inclined wall portion 24 adjacent its bottom end. In the open position, a major part of the blade is received in the blade compartment 70.

Each of the curved flow control valve blades 92 and 95 have convex upper sides and concave lower sides. In the closed positions they form an internal holding chamber 100 in the conduit 60 of a definite or specific volume.

Figures 6, 7:
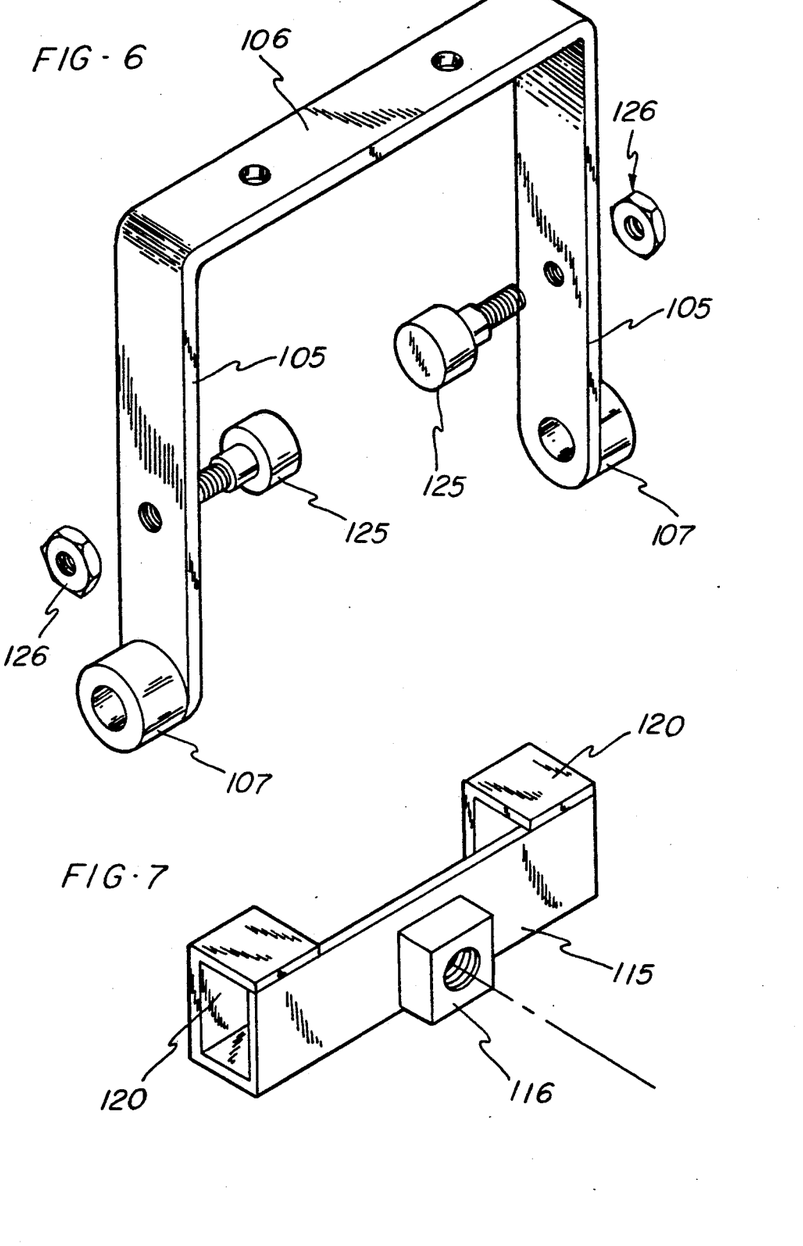
FIG. 6 is a perspective view of one of the blade support arms.
FIG. 7 is a perspective view of the connecting yoke which joins the piston rod to the blade arm.

The valve blade 92 is mounted for pivotal movement between a flow-permitting position and the flow-blocking position, with respect to the conduit 60, on a first pair of blade supporting arms 105. The blade arms 105 comprise a generally U-shaped blade support member, as illustrated in FIG. 6, in which the arms 105 are joined or connected at the top by a cross member 106 which is bolted to a back end of the blade, within the offset compartment or chamber 70.

Figure 5:
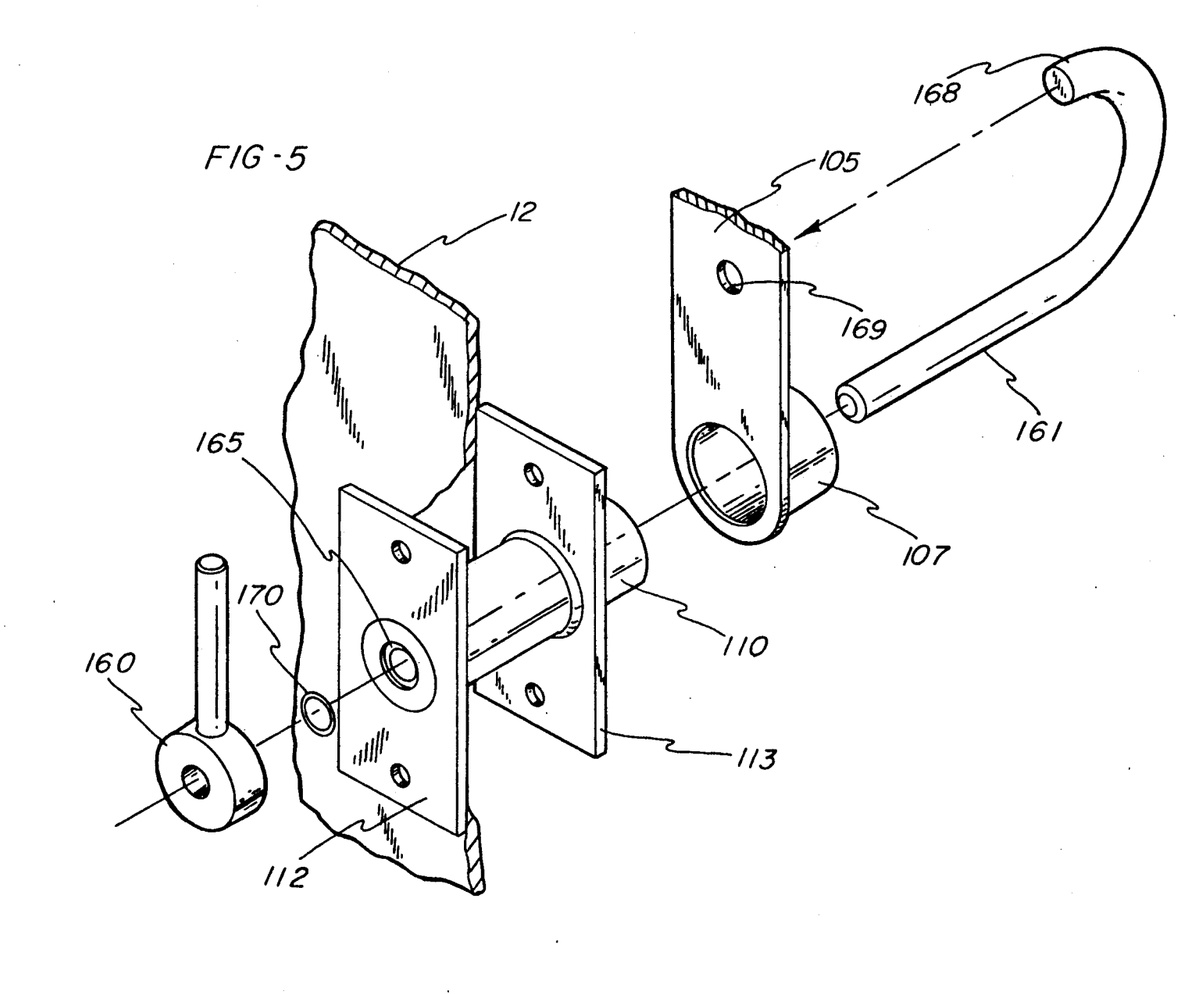
FIG. 5 is an exploded view showing the connection of the external indicator to one of the bade arms.

The lower ends of the blade arms 105 carry sleeve bushings 107 which are mounted on pivot pins 110, as shown in the exploded view of FIG. 5. The blade mounting pins 110 are, in turn, carried on a pin-supporting plate 112 and mounted, in adjustable manner, on one of the side plates 12, 13 by a backing plate 113. The blade mounting arrangement in this invention is preferably the same as that disclosed in my above-defined co-pending application Ser. No. 775,006.

Similarly, the blade 95 is mounted on identical blade support arms 105, supported between the respective side plates 12 and 13 on support pins in the same manner as described. The lower blade may move through the slot 90 between a retracted position as shown in broken lines in FIG. 2, within the enclosing chamber 89 to a flow-blocking or closed position with respect to the conduit 60 as shown in full lines. In the closed position, the nose 95a of the blade rests at the lower end of the wall portion at the outlet flange 25, and closes the lower end of the chamber 100.

The flow control blades 92 and 95 are controlled preferably by the pneumatic air cylinders 35 and 55, respectively, between their respective open and closed positions. The direct connection between the actuator cylinders 35 and 55 and the respective blade arms are identical and are substantially as described in my above-identified co-pending application. For this purpose, a yoke or cross member 115 (FIG. 7) is carried on the extended end of one of the piston rods (not shown) by the threaded nut 116. The yoke is formed with rectangular-like cams 120 at its opposite ends. The cams 120 receive therein a cam follower in the form of a precision roller 125, one each mounted on each of the blade arms 105 by back nuts 126.

The rollers 125 are proportioned to be received within the rectangular cams 120, so that linear movement of the piston rods is translated directly into arcuate movement of the blade and supporting arms. Limited rolling movement of the rollers 125 within the followers 120 permits the piston rod to movement along a straight line, such as the line 126, FIG. 2, without incurring side thrusts. During this movement, the axis of the rollers move along the arc 128, FIG. 2. This arc is nearly tangent to the axis 126 of the cylinder providing an efficient and direct connection between the actuator cylinders 35, 55 and the respective blade arms. The connections between the motion cylinders and the blade arms is one which is self-aligning. The alignment of the cylinder mounting surfaces 30 and 50 is not critical. The wear on the nose bearings of the air cylinders is minimized, and air loss due to wear of the nose bearings in double acting air cylinders is prevented.

Blade slot seals and blade side seals may be employed as shown in my co-pending application or as shown in my prior U.S. Pat. No. 3,916,949. However, this invention illustrates an improved blade slot sealing arrangement by which the seals may be replaced from a position outside the housing 10 by extraction through seal access openings formed in the side plates 12, 13. The blade seals, at the blade slots, are subject to wear over time, and the ability to inspect and/or replace these seals without removing the valve 10 from the conduit or installation in which it is placed, is of substantial importance.

Figure 3:
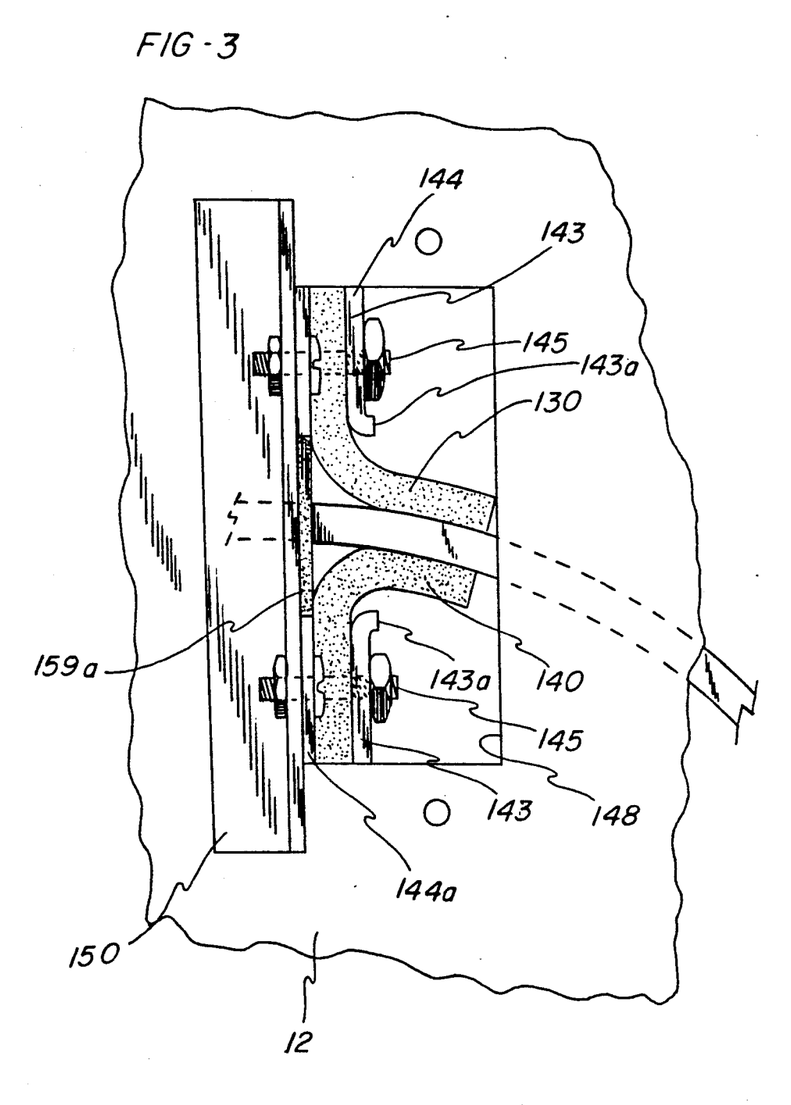
FIG. 3 is an enlarged detail showing the arrangement for the top and bottom blade seals.

As shown in FIGS. 2 and 3, the upper and lower elastomeric sealing for each of the blades may be identical. The elastomeric lips 130 and 140 are mounted between front and rear support plates 143, 144 by bolts 145. The front plate 143 may be L-shaped or formed with a rib 143a to provide added strength and support for the blade sealing elastomer lip 130 or 140. The front plate 143 has a width corresponding generally to the width of the elastomer seal 130 or 140 in the housing.

The backing plate 144, which is an elongated strip of metal, has a length which exceeds the spacing between the side plates 12, 13, and extends outwardly through access openings 148 formed in the side plates. The plate 144 at the extended ends 144a is secured in place by bolting or screwing to a small angle bracket 150 mounted on the outer surface of the respective side plates adjacent the access openings 148.

Figure 4:
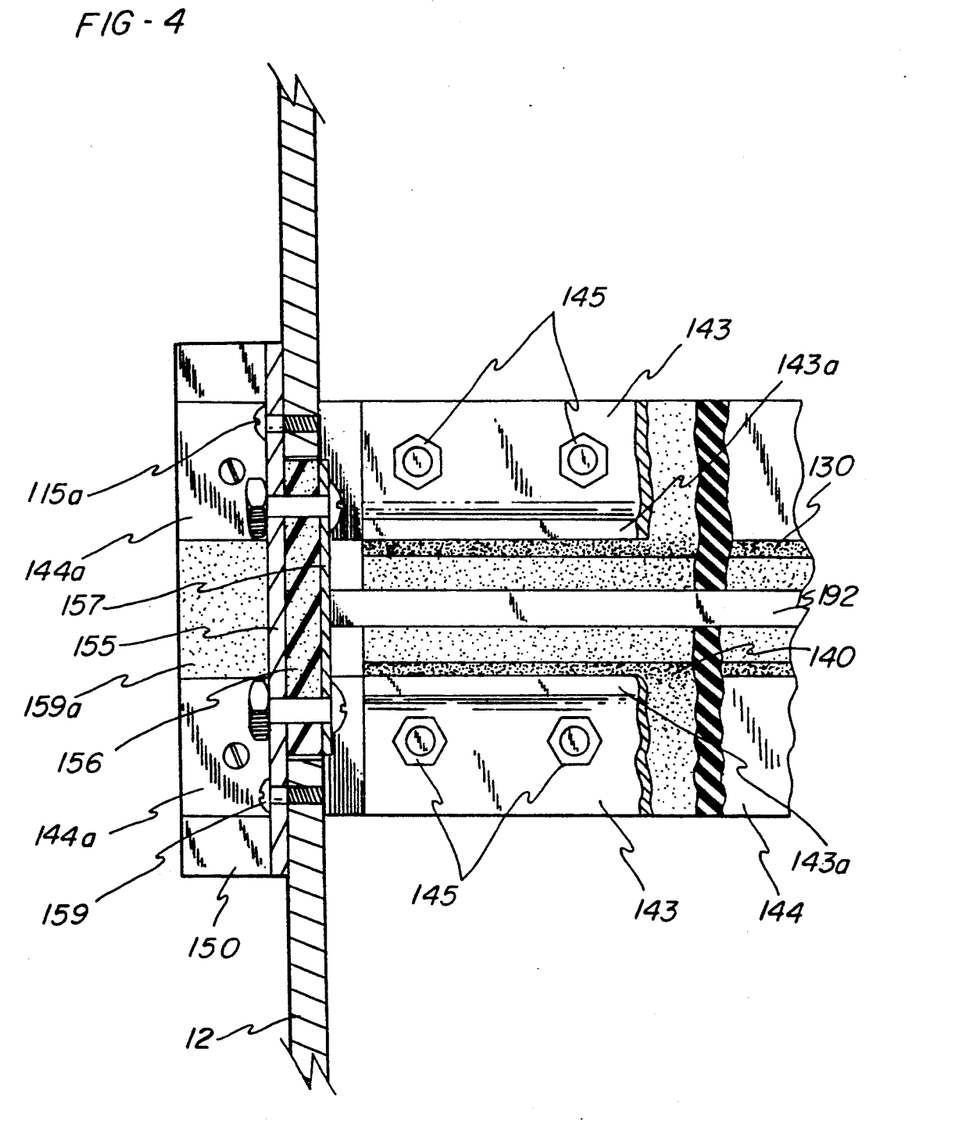
FIG. 4 is an enlarged detail showing the arrangement for the side blade seal.

The access openings 148 are proportioned to permit the insertion and removal of the upper and lower blade seals therethrough. Also, the lateral sides of each of the blades, at the respective blade slots, are sealed by a closure plate 155, which closes the openings 148. The closure plate 155 supports, on its inside surface, a removable blade side seal 156, the seal being proportioned to extend through the opening 145 and into engagement with the lateral sides of the respective blade. The side seals 156 may be a pad of elastomeric material, such as a closed cell foam rubber, formed with a high density, long wearing, blade-engaging surface 157, such as UHMW polyethylene. The side seal 156 is held in place on the plate 155 by a pair of bolts 158. The closure plate 155 is secured to the side plate 12 or 13 by a pair of screws 159. A small pad 159a of sealing material is mounted on the bracket 150 to fill the space between the extended ends 144a of the seal backing plates 140, thereby to close the gap which would otherwise be formed between the closure plate 155 and the bracket 150.

In replacing the blade slot seals, the extended ends 144a are removed from the support bracket 150, thereby permitting the transverse extraction of the entire blade slot seal assembly, including the lip seal 130 or 140 and the pair of backing plates, without having to disturb the connection of the valve from its mounted position.

The blades 92 and 95 may also be provided with a cam action movement. This may be accomplished by offsetting the blade pivot axis from the center of curvature of the blade, so that the upper blade surface moves into a camming action with side plate seals as described in my U.S. Pat. No. 3,380,475.

The valve blades 92 and 95 may be provided with remote reading position indicators 160, as shown in FIG. 1 and as described in my co-pending application. FIG. 5 represents an exploded view of the indicator 160 and its operative connection to the associated blade arm 105. The indicator 160 is thus mounted for movement by the blade arms and provides a visual indication of the relative position of the respective blade within the housing, and also provides a positive or visual indication of blade movement.

As shown in FIG. 5, one of the blade-supporting pins 110 is hollow to receive the extended end of a generally U-shaped connector rod 161. The longer end of the rod 161 extends through an opening 165 formed in the bushing 110, with the indicator 160 mounted on the remote end outside of the side plate 12. The indicator 160 may be set in place by a set screw or the like.

The shorter inner end 168 of the rod 161 is received within a hole or opening 169 formed in the arm 105 and provides a driving connection for the rod, so that the rod is caused to rotate with the blade arm, thereby moving the indicator accordingly. An O-ring 170 may be received between the indicator 160 and the mounting plate 112, in a recess formed in the bushing for the purpose of sealing the opening and to prevent ingress or egress of contaminants therethrough.

It will be understood that pneumatic control means are employed for the purpose of providing a desired cyclic movement to the flow control blades, such that the upper blade 92 opens to admit material from the inlet 45 into the cavity 100. The blade 92 then closes, and the blade 95 opens to discharge the material from the holding cavity 100 through the outlet 26 and thereafter recloses. The pneumatic control system as disclosed and described in my U.S. Pat. No. 3,813,015 may be used for this purpose, and is incorporated herein by reference. The pneumatic control system of patent '015 is jam proof in that the blades will be caused to move through a cycle of operation which will release jamming objects. Further, while the blades are in the closed position, they are positively biased or held in this position until they are opened, providing for positive operation. Further, the system as described in patent '015 is capable of being operated on a pulsed basis. That is, a pulse can be applied to the system by closing the switches 100 of patent '015 by remote control and opening the same to cause the valve blades to move through one full cycle of operation, which cycle includes the opening and closing of the upper blade 92, while the lower blade 95 remains closed, to fill the measuring chamber or cavity 100, followed by the opening and closing of the bottom valve blade 95 to empty to contents of the cavity, while the upper blade 92 remains biased to its closed position. When operated continuously and then shut off, the control system will always cause the valve to complete a cycle of operation, and finish with both blades in the closed position, and the measuring cavity 100 empty.

The low profile lock gate valve according to this invention requires relatively low amounts of power for operation. It will be seen that since the valve blades curve downwardly, in the direction of flow, as they move to the closed position, the weight of material falling and impacting the blades on the upper surface tends to urge the blades to move, by themselves, into a closed position. In the case of the lower blade 95, which is already in a closed position, during measuring, the weight of material tends to hold the blade closed.

It will also be noted that the major portion of the blades, within the flow conduit or passageway 60, are almost vertical to the direction of flow, when the valve blades are closed. The major part of the weight is carried by the sloping walls of the conduit. Therefore, in the closed position very little of the weight of the overburdening or supported material rests on the upper surface of the blade tending to restrict the blade opening movement. Accordingly, each of the blades may be easily withdrawn through the material even though the material is resting on their upper surfaces. Thus the blades may be both closed and opened with a minimum of resistance imparted by the material being controlled.

While the offset compartment 70 and 89 are shown as being essentially closed and sealed, they may be in fact pressurized from a suitable source of air under pressure to improve the effectiveness of the seals, or to assure that no contamination or material escapes from the valve. Also, the housings may be purged by air pressure for cleaning as described in my U.S. Pat. No. 5,139,048.

Construction and servicing costs are reduced by the ability to inspect or replace the blade seals without removing the valve from its installation. Costs are reduced by the fact that the blades, blade arms, linkages and seals are interchangeable. Also, since the drive linkage between the rotary motion and linear motion is self-aligning, assembly is simplified and cylinder wear is held to a minimum. Also, since the walls which make up the valve conduit 60 as well as the holding chamber 100 therein are sloping at about 45° to the vertical, the conduit is self-cleaning. The capacity of the holding chamber 100 may be reduced as desired, to a lower value if necessary. This may be done, for example, by the insertion of an angled fill plate 300, as shown in broken line in FIG. 2. The plate 300 may be adjusted to reduce the capacity of the holding chamber in the event such adjustment becomes necessary for particular installations.

The compact arrangement of the flow control valve 10 permits the same to be mounted into applications where clearance space is at a premium. The air cylinders 35 and 55 are of short stroke design and are easily positioned within the profile of a typical valve opening. The valve flow control blades are fully enclosed to prevent contamination of the flowable bulk material being controlled by the valve 10. The relation position and movement of the sequencing blades 92 and 95 may readily be ascertained simply by observation of the valve blade indicators 160. Also, while the invention is disclosed in connection with the use of air actuated cylinders 35 and 55, which are preferred, it is understood that other motive force means may be used, such as electric solenoids.

While the form of apparatus herein described constitutes a preferred embodiment of this invention, it is to be understood that the invention is not limited to this precise form of apparatus, and that changes may be made therein without departing from the scope of the invention which is defined in the appended claims.

What is claimed is:

1. A lock gate valve for dispensing measured quantities of dry particulate material comprising:
   a valve housing having a pair of generally planar complementary shaped, spaced-apart side plates, said side plates each having an upper edge, a lower edge, a front edge, and a rear edge,
   said housing further including a pair of end closure plates, said end closure plates extending between said side plates with one each positioned generally along one of said front and rear edges and each extending between said upper side plate edges and said lower side plate edges,
   one of said end closure plates being formed with a laterally offset upper portion having means on an exterior surface thereof forming a first actuator cylinder mounting region and further having a lower inwardly inclined wall portion terminating at said side plate lower edges, the other of said end closure plates having means on an exterior surface thereof forming a second actuating cylinder mounting region,
   wall means intermediate said side plates and defining a flow conduit for such material extending from said upper edges to said lower edges and defining with said side plates a valve inlet positioned between said upper edges and a valve outlet positioned between said lower edges, said intermediate wall means including first inner wall means extending from a side of said inlet at the top and terminating at said lower inwardly inclined wall portion at the bottom, said first inner wall means defining with said first end closure plate, a first flow control blade receiving enclosure,
   second inner wall means spaced laterally from said first inner wall means including a first inclined wall section having an upper end at said valve inlet in spaced relation to said first inner wall means defining a portion of said flow conduit and formed with a second inclined wall section formed generally at right angles to said first inclined wall section and extending in a direction generally parallel to the inclined wall portion of said first end plate, and terminating at said valve outlet at a position remote from said end plate inclined wall portion, said second inner wall means defining with said second end plate a second flow control blade receiving enclosure,
   means in said first inner wall means defining a first valve blade slot extending between said side plates,
   means in said second inclined wall section of said second inner wall means defining a second blade slot extending between said side plates,
   a first curved flow control blade having a convex upper side and a concave lower side movable through said first blade slot in said housing between a retracted position in which a major portion of said first blade is received within said first blade-receiving enclosure, to a closed flow-blocking position in which a nose end of said blade is in contact with said second inner wall means adjacent a lower end of said first inclined wall section thereof,
   a first pair of blade support arms in said first blade-receiving enclosure and having upper ends connected to support first blade and having lower ends pivotally connected to said housing side plates,
   first actuator cylinder means on said first actuator mounting region for actuating said blade by pivotal movement of said arms between said flow permitting and flow blocking position,
   a second curved flow control blade having an upper convex side and a lower concave side movable through said second blade slot across said conduit and into said second flow control blade-receiving enclosure between a retracted open position and a closed flow blocking position in which a nose end of said second flow control blade is in contact with said inwardly inclined wall portion adjacent said outlet,
   a second pair of blade support arms in said second enclosure and having upper ends connected to support said second blade and having lower ends pivotally connected to said housing side plates,
   second actuator cylinder means on said second mounting region and connected to said second blade support arms for moving said second arms and said second blade about its said pivot between said closed flow blocking position and said retracted open position, and
   said blades in said closed positions thereof defining therebetween a material holding chamber in said conduit.

2. A lock gate valve for dispensing measured quantities of dry particulate material comprising:
   a valve housing having a pair of spaced-apart side plates,
   said side plates each having an upper edge, a lower edge, a front edge, and a rear edge,
   said housing further including means defining a pair of spaced-apart end closures extending between said side plates positioned generally along one of said front and rear edges and extending between said upper side plate edges and said lower side plate edges,
   one of said end closures forming an inwardly inclined wall portion terminating at said side plate lower edges,
   wall means between said side plates and defining a flow conduit for such material extending from said upper edges to said lower edges and defining with said side plates a valve inlet positioned between said upper edges and a valve outlet positioned between said lower edges, said wall means including first inner wall means extending from a side of said inlet at the top and terminating at said lower inwardly inclined wall portion at the bottom, said first inner wall means defining with one of said end closures a first flow control blade receiving enclosure,
   second inner wall means spaced laterally from said first inner wall means including a first inclined section having an upper end at said valve inlet defining a portion of said flow conduit and formed with a second inclined section formed at approximately a right angle to said first inclined section and extending in a direction generally parallel to said inclined wall portion and terminating at said valve outlet at a position remote from said inclined wall portion, said second inner wall means defining with the other of said end closures a second flow control blade receiving enclosure, means in said first inner wall means forming a first valve blade slot, means in said second inner wall means in said second inclined section forming a second valve blade slot, a first curved flow control blade having a convex upper side and a concave lower side movable through said first blade slot in said housing between a retracted flow-permitting position in which a major portion of said first blade is received within said first blade-receiving enclosure, to a closed flow-blocking position in which an end of said blade is in contact with said second inner wall means adjacent a lower end of said first inclined section thereof, first blade support arm means in said first blade-receiving enclosure and having upper ends connected to support first blade and having lower ends pivotally connected to said housing side plates, means for actuating said first blade by pivotal movement between said flow permitting and flow blocking positions, a second curved flow control blade having an upper convex side and a lower concave side movable across said conduit and into said second flow control blade-receiving enclosure between a retracted open position and a closed flow blocking position in which an end of said second flow control blade is in contact with said inwardly inclined wall portion adjacent said outlet, blade support arm means in said second enclosure and having upper ends connected to support said second blade and having lower ends pivotally connected to said side plates, and means for actuating said second blade by pivotal movement between said closed flow blocking position and said open flow permitting position, said blades in said closed positions defining therebetween a material holding chamber in said conduit.

3. The valve of claim 2 in which said valve blades in said closed positions present substantially vertical convex upper sides to such material in said flow conduit.

4. The valve of claim 2 further comprising a pair of air actuated cylinder motors mounted on said end closures, one each for each of said blades, said piston motors having piston rods extending through said end closures, and means directly connecting said piston rods to the said blade support arm means of the associated said blades for moving said blades between said retracted and flow blocking positions thereof.

5. The valve of claim 2 further comprising curved blade slot seals at each of said blade slots, said seals having elastomer sealing ends in engagement with one of said blade surfaces and each of said seals further having a blade seal support in the form of a backing plate extending between said housing side plates, means in said side plates defining access openings for the inspection and replacement of said blade seals, a portion of said backing plates extending laterally outwardly through said side plate openings, and means mounted on an exterior surface of said side plates engaging and supporting said backing plates at said backing plate extensions for retaining said blade seals in an operative position with respect to said blade curved surfaces.

6. A lock gate valve for dispensing measured quantities of dry particulate material comprising:

a valve housing having a pair of spaced-apart side plates, said side plates each having an upper edge and a lower edge, plate means between said side plates and defining a flow conduit for such material extending from said upper edges to said lower edges and defining with said side plates a valve inlet positioned between said upper edges and a valve outlet positioned between said lower edges, said plate means including first inner wall means extending from one side of said inlet at the top and terminating in a lower inwardly inclined wall portion at the valve bottom terminating at said outlet, said plate means further including second inner wall means spaced laterally from said first inner wall means including a first inclined section having an upper end at said valve inlet defining a portion of said flow conduit and formed with a second inclined section formed at approximately a right angle to said first inclined section and extending in a direction generally parallel to said inclined wall portion and terminating at said valve outlet at a position remote from said inclined wall portion, means in said first inner wall means forming a first valve blade slot, means in said second inner wall means in said second inclined section forming a second valve blade slot, a first curved flow control blade having a convex upper side and a concave lower side movable through said first blade slot in said housing between a retracted open position and a flow-blocking position in which an end of said blade is in contact with said second inner wall means adjacent a lower end of said first inclined section thereof, first blade support arm means pivotally connected to said housing side plates and having upper ends connected to support first blade, means for actuating said first blade by pivotal movement between said flow permitting and flow blocking position, a second curved flow control blade having an upper convex side and a lower concave side movable across said conduit between a retracted open position and a closed flow blocking position in which an end of said second flow control blade is in contact with said inwardly inclined wall portion adjacent said outlet, second blade support arm means pivotally connected to said side plates and having upper ends connected to support said second blade, and means for actuating said second blade by pivotal movement between a closed flow blocking position and an open flow permitting position, said blades in said closed positions defining therebetween a material holding chamber in said conduit.

7. The valve of claim 6 in which said inwardly inclined wall portion is flat and is at an angle of about 45° to a vertical line extending between said inlet and said outlet.

8. In a gate-type valve having side walls which partially define an internal valve conduit and in which a curved, flow control blade moves transversely across said conduit through a blade slot between a retracted flow-permitting position and a closed flow-blocking position, and in which upper and lower flexible blade seals are positioned at the slot and have curved ends bearing against respective upper and lower surfaces of said blade for sealing said blade at the slot, the improvement comprising:

each of said seals including a backing plate positioned at one side of said seal and a retention plate positioned on the other side of said seal, means securing said backing plate to said retention plate with said seal therebetween, means in said valve housing side walls defining access openings formed at said blade slots, said backing plates having extension portions extending laterally outwardly of said conduit through said side wall openings, means on said valve side walls engaging and supporting said backing plate extension portions for retaining said blade seals in an operative position with respect to said blade surfaces, and closure means closing said openings.

9. The valve of claim 8 further comprising blade edge seals carried on said closure means and enjoying a lateral edge of said blade.

* * * * *